Figure 1:
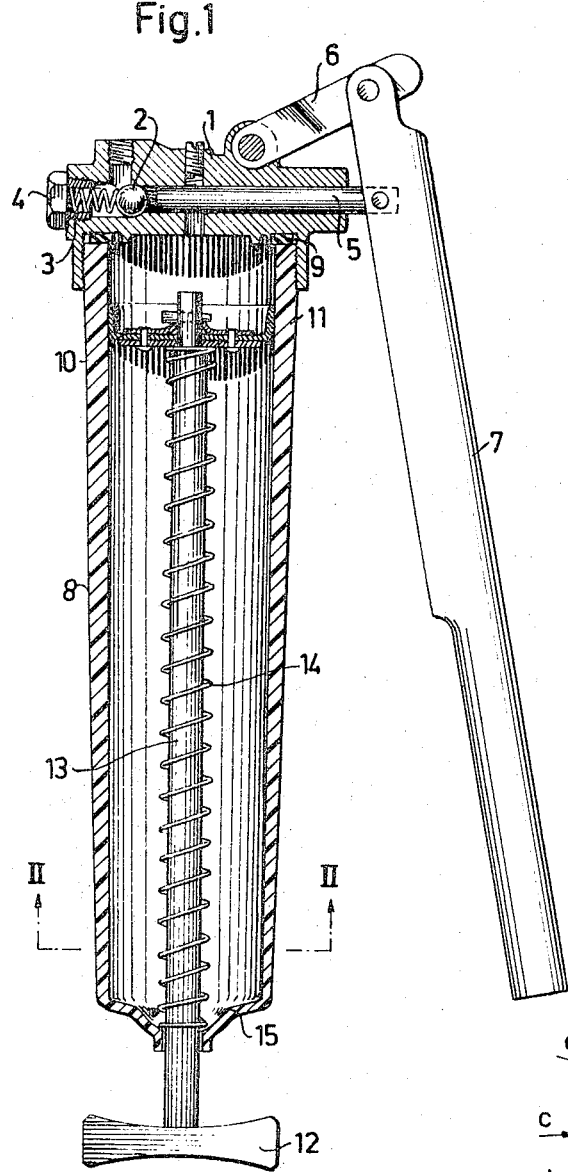

Aug. 29, 1967    B. HEDBLAD    3,338,478
LUBRICATING GUN AND A GREASE CONTAINER INTENDED FOR THE SAME
Filed July 19, 1965

United States Patent Office 3,338,478
Patented Aug. 29, 1967

3,338,478
LUBRICATING GUN AND A GREASE CONTAINER
INTENDED FOR THE SAME
Börje Hedblad, Solna, Sweden, assignor to AMA-
Produkter Aktiebolag, Solna, Sweden
Filed July 19, 1965, Ser. No. 473,109
Claims priority, application Sweden, July 31, 1964,
9,335/64
2 Claims. (Cl. 222—154)

The present invention relates to a lubricating gun comprising a pressure head, known per se, having a high pressure piston and a lever mechanism, and also a grease container having a low pressure piston and a piston rod provided with a handle.

Various embodiments of lubricant guns are in themselves already known. However, most present grease containers are made from metal. Usually the grease container is manufactured from metal tubing which is cut into suitable lengths and then threaded at both ends, degreased and chromium plated. They are provided with low pressure pistons, seals and a bottom lid and are then screwed into the pressure head. The grease is either inserted directly into the grease container or is also inserted into a separate lubricating cartridge, which is introduced into the grease container which at the same time constitutes the one lever arm of the lever system of the high pressure pump.

These lubricating guns present a variety of disadvantages. The thickness of the lubricant container is determined with respect to the maximum bending stresses. Bending stresses are greatest at the pressure head and taper off successively at increasing distances from the same. Since the grease container is made from steel tube having uniform thickness, it consequently becomes necessary to mechanically overdimension said grease container excepting the zone immediately adjacent to the pressure head. Thus, material consumed with respect to strength is unnecessarily high. Further, the lubricant container must be subjected to anti-rust treatment, i.e. chromium plating, which similarly increases manufacturing costs. Moreover, the pieces of tubing must be previously threaded at both ends, constituting a not modest portion of the cost of manufacture. Another manufacturing process is assembly. The low pressure piston and seals, among other things, must be assembled onto the piston rod and then inserted into the grease container. The piston rod is generally bent at one end to form a handle, thus necessitating the bottom lid to be fitted to the piston rod before the low pressure piston and the seals can be assembled. This means that the low pressure piston and cuff seal, usually presenting a U-section, must be inserted into the grease container with the seal first, a very intricate and difficult procedure, since the unused seal has a somewhat larger outer diameter than the inner diameter of the grease container. It would be much simpler, and consequently cheaper, if it were possible to first insert the low pressure piston rod into the grease container from the pressure head side, grip the piston rod at the other end of the grease container and draw in said low pressure piston and the cuff seal. However, this presupposes that the handle of the piston rod can be assembled after the low pressure piston and the cuff seal are fitted onto the piston rod. The outer surface of the grease container in the known lubricating guns is smooth. Considering that the surface, as a rule, is seldom free of grease this means that the lubricating gun is quite slippery and when in use must be held with a firm hard grip which in itself is unnecessary.

A further disadvantage is that when using the lubricating gun outdoors in cold weather it feels very cold to the touch due to the relatively good specific heat conductive properties of the steel. In some cases several lubricating guns containing various types of lubricant are used in the same workshop or the like, which lubricants can only be recognized due to the fact that they have different colours. Since with known lubricating guns the grease container is not transparent, it is impossible to see which lubricating gun contains a certain definite type of grease, thus necessitating some of the grease in question to be squeezed out onto a scrap of paper, or a piece of rag or the like in order to check the type of grease.

The object of the invention is to provide a lubricating gun which does not possess the above mentioned disadvantages, is cheaper to make than the known types and is simpler to assemble as well as being easier to work with. The lubricating gun shall further be suitable for mass production and can be used outside, even in very low temperatures, besides which it is lighter in weight.

The invention principally consists of a lubricant container and its bottom cap manufactured in a cup shape section in grease and cold resistant, high strength material having low heat-conduction properties, preferably plastic, e.g. by injection moulding. The walls of the cup are suitably given a profiled outer surface which is material saving as well as being "kind to the hands." The piston rod is advantageously designed with a removable, low pressure piston rod handle similarly made by injection moulding.

Figure 2:
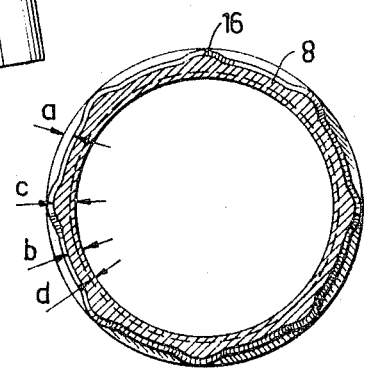

The invention will now be further described in connection with the attached drawing where:

FIGURE 1 shows a longitudinal section of a lubricating gun according to the invention, and FIGURE 2 shows a cross section of the grease container, near the bottom end.

The pressure head is manufactured in a method known per se and consists of an end wall piece 1 having an inbuilt ball valve 2, 3, 4, a high pressure piston 5, a link arm 6 and a lever 7. The grease container 8 of the lubricating gun is threaded at the end wall section and serves at the same time as a second lever. Sealing between the end wall section and the grease container 8 is accomplished by means of a seal 9. Located in the grease container is a low pressure piston 10 and a cuff seal 11, which are assembled on the piston rod 13 around which the pressure spring 14 of the piston is arranged. The bottom 15 of the lubricant container is, accordingly, manufactured as an integral part with the side walls and shows a central free going hole for the piston rod. The piston rod is provided with a handle 12. The side walls of the grease container are provided with an external profile e.g. in the form of longitudinal ridges 16 according to FIGURE 2, or ribs. According to the invention, the grease container 8 is manufactured, as was just mentioned, together with the bottom cap 15 in an integral part from a grease and oil resistant material, preferably plastic, which at the same time presents good resistance to cold and low specific-heat conducting properties and is light weight, said container suitably being produced by means of injection moulding. In addition to a lower total weight it presents the advantage that the grease container, without any after-working whatever, such as, for example, threading of the ends or surface treatment, can be assembled with the remaining parts of the lubricating guns. Moreover the plastic grease container feels much warmer to the touch in cold weather than a metal container. Similarly the grease takes longer to cool down in the plastic container if the lubricating gun is taken out of doors for short periods, so that a rise in the viscosity of the grease, appearing as a sequence to lower temperatures, takes longer to occur. Further, due to the method of injection moulding, a considerably smoother outer surface is obtained.

According to a further embodiment of the invention, as can be seen from FIGURE 2, the grease container 8 is provided with external profiling consisting of ridges 16 or ribs along the whole length of the grease container. By hese means is achieved a more positive grip on the lubricating gun so that it cannot slide out of the hand as is possible with a smooth surface, particularly as the surface usually becomes quickly coated with grease and consequently becomes slippery.

According to a further embodiment of the invention, the depth of profile decreases at $a$, i.e. the thickness of the material increases at $b$, between the ridges 16 in a direction towards the pressure head. Consequently the advantage is gained that the grease container, which constitutes one lever arm of the high pressure piston, becomes stronger towards the pressure head, corresponding to the increase of the bending stresses in a direction towards the pressure head. In this way the profiling becomes more effective and the strength greatest where is needed most. From the aspect of injection moulding these measures carry no disadvantages, such as e.g. increased cooling time prior to mould opening, which would imply a longer production time per unit. The time taken to harden is directly dependent on the largest existing material thickness $c$, in the detail. This in turn however depends on the maximum occuring load. With increased distance from the pressure head, the thickness of the material decreases between the profile runs from $c$ to $b$. The profile runs present constant thickness $b$ and thus determine the setting time. The decreasing material thickness between the profile runs implies a considerable saving in material without departing from strength.

When the grease containers are manufactured by means of injection moulding it must be ensured that a certain clearance $d$ for the core in moulding tool is present, i.e. the core and thus the inner wall of the grease container must be slightly conical having increased diameter towards the pressure head. This means that the seal of the low pressure piston must be flexible to a required degree and elastically follow the diameter curve against the pressure head. According to a further characteristic of the invention, the low pressure piston 10 is provided with a flexible cuff seal 11 made of grease and cold resistant material, preferably synthetic rubber, which gives positive sealing at the smallest diameter adjacent to the cap 15 of the grease container as well as the largest diameter adjacent to the pressure head.

According to a further embodiment of the invention, a transparent or semi-transparent respectively ANS-plastic (acrylonitrile styrene) is used for manufacturing said grease container 8. In this way the advantage is obtained of being able to see how much grease remains in the lubricating gun and also which type of grease it is, under the assumption that various types of grease have different colours.

According to a further embodiment of the invention the low pressure piston rod 13 is provided with a straight end and removable handle 12, preferably also injection moulded from grease and cold resistant plastic material. In this way assembly of the lubricating gun is facilitated insomuch that the low pressure piston 10 and the cuff seal 11 can be assembled to the piston rod 13 in a separate working operation and after which a pre-manufactured unit having the piston rod first and the U-shaped seal last is inserted into the grease container 8 whereby no risk exists of the cuff seal 11 being jammed or damaged on assembly. The same advantage presents itself when changing the cuff seal in a lubricating gun according to the invention.

Although the invention has been described in connection with an embodiment of the same it can however in an arbitrary manner be varied within scope of the following claims.

What I claim is:
1. A grease container for grease guns of the type including a high pressure head with a high pressure piston and a lever mechanism for operating the high pressure piston to provide a pressure pump for the grease, the grease container forming one lever of the pressure pump, the improvements comprising the grease container and its bottom being formed as an integral cup-shaped member with an inner diameter and a wall section both progressively increasing in dimension towards the high pressure head, said integral cup-shaped member being made of grease resisting, cold resisting and impact resisting plastic material.

2. A grease container as claimed in claim 1, said container being made of a light transmitting material.

References Cited
UNITED STATES PATENTS

| | | | |
|---|---|---|---|
| 2,497,762 | 2/1950 | Davis | 222—256 X |
| 2,687,097 | 8/1954 | Engseth | 222—256 X |
| 2,941,854 | 6/1960 | Jernander. | |
| 3,038,768 | 6/1962 | Kludt | 222—256 X |
| 3,189,069 | 6/1965 | Stowell | 16—110 X |

ROBERT B. REEVES, *Primary Examiner.*

N. L. STACK, *Assistant Examiner.*